United States Patent [19]

Burgoyne, Jr. et al.

[11] Patent Number: 4,816,543
[45] Date of Patent: Mar. 28, 1989

[54] POLYURETHANE SYSTEM USING MONOTERTIARY-ALKYLTOLUENEDIAMINE AS A CROSS LINKER

[75] Inventors: William F. Burgoyne, Jr., Allentown; Jeremiah P. Casey, Emmaus; Dale D. Dixon, Kutztown; Barton Milligan, Coplay, all of Pa.

[73] Assignee: Air Products and Chemicals, Inc., Allentown, Pa.

[21] Appl. No.: 768,886

[22] Filed: Aug. 23, 1985

Related U.S. Application Data

[63] Continuation-in-part of Ser. No. 659,597, Oct. 11, 1984, abandoned.

[51] Int. Cl.$^4$ .................. C08G 18/10; C08G 18/32
[52] U.S. Cl. ........................................ 528/64; 528/76; 528/78; 528/79; 528/80; 528/82; 528/83; 528/84; 528/85
[58] Field of Search .................. 527/167; 528/64, 76, 528/78, 79, 80, 82, 83, 84, 85

[56] References Cited

U.S. PATENT DOCUMENTS

| | | | |
|---|---|---|---|
| 3,428,610 | 2/1969 | Klebert | 528/64 |
| 3,752,790 | 3/1973 | McShane et al. | 528/63 |
| 3,846,351 | 11/1974 | Huffaker et al. | 521/163 |
| 4,048,105 | 9/1977 | Salisbury | 521/128 |
| 4,218,543 | 8/1980 | Weber et al. | 521/51 |
| 4,269,945 | 5/1981 | Vanderhider et al. | 521/167 |
| 4,365,051 | 12/1982 | Chung et al. | 528/64 |
| 4,374,210 | 2/1983 | Ewen et al. | 521/159 |
| 4,440,952 | 4/1984 | Ihrman | 564/305 |
| 4,482,690 | 11/1984 | Orphanides | 528/64 |
| 4,487,908 | 12/1984 | Dominguez | 528/48 |
| 4,526,905 | 7/1985 | Lucast et al. | 528/64 |
| 4,529,746 | 7/1985 | Markovs et al. | 521/159 |
| 4,530,941 | 7/1985 | Turner et al. | 521/176 |

OTHER PUBLICATIONS

European Patent Application, Publication No. 0069286, published Jan. 12, 1983, applicant BASF A/G, Federal Republic of Germany.

*Primary Examiner*—Harold D. Anderson
*Assistant Examiner*—Dennis R. Daley
*Attorney, Agent, or Firm*—Keith D. Gourley; James C. Simmons; William F. Marsh

[57] ABSTRACT

This invention relates to improved polyurethane systems prepared by reacting an organic polyisocyanate with a hydroxyl containing compound, the improvement comprising utilizing mono tertiary-alkyltoluenediamine where the tertiary-alkyl group is ortho to an amine group as a chain extender or component thereof. The ortho-tertiary-butyltoluenediamine isomer is particular effective for use in reaction injection molding of polyurethanes and can be formulated with polyol as a chain extender mix.

18 Claims, 3 Drawing Sheets

POLYURETHANE SYSTEM USING MONOTERTIARY-ALKYLTOLUENEDIAMINE AS A CROSS LINKER

CROSS REFERENCED TO RELATED APPLICATION

This invention is a continuation-in-part of U.S. Ser. No. 659,597 having a filing date of Oct. 11, 1984 now aband. That subject matter is incorporated by reference.

TECHNICAL FIELD

This invention relates to polyurethane-urea systems utilizing an alkylated aromatic diamine as a cross-linker.

BACKGROUND OF THE INVENTION

Polyurethane-urea elastomers have been widely used in industry for the manufacture of various moldings. The compounds are prepared from organic polyisocyanates and compounds having active hydrogen atoms capable of reacting with the isocyanate group. Compounds having active hydrogen atoms are organic compounds having molecular weights from 400 to about 12,000 and typically are polyols of the polyether or polyester polyol type. Many types of polyurethanes exist, and to differentiate these polyurethanes, they are often categorized by the process by which they are made as for example cast elastomers are formed by a casting process and RIM elastomers are formed by a technique called reaction injection molding. Foam elastomers, both rigid and flexible, are classified by their properties.

Reaction injection molding (RIM) is widely used today in the manufacture of molded parts particularly for the automotive industry. Examples of molded parts which can be produced by this process include automobile grilles and bumpers, support mountings for headlight and tailights, and in general, large moldings weighing from about 3 to 10 kilograms or more. A reaction injection molding involved mechanically mixing highly reactive starting components via multi-stream high velocity impingement and injecting the mixed component into the mold within a very short time by means of high output, high pressure dosing apparatus. Large quantities of liquid, highly reactive materials are delivered into the mold within a very short time and then cured, within a time usually from about 1 to 5 minutes.

RIM processes are shown in the following patents:

U.S. Pat. No. 4,218,543 discloses the RIM processing of methylene diphenylisocyanate-polyol systems which employ an aromatic diamine as a cross-linker or chain extender to provide rigidity for the urethane system. In the particular application described, diethyltoluenediamine, where the ethyl groups are ortho to each amino group, is used as the chain extender. As acknowledged in the patent, toluenediamine and many other aromatic diamines are either too reactive or are too slow in setting time for practical RIM systems.

U.S. Pat. No. 4,374,210 discloses a particular RIM process which utilizes a prepolymer as a reactive isocyanate material as opposed to the one shot process shown in the U.S. Pat. No. 4,218,543. Numerous polyisocyanate-prepolymers can be utilized in the RIM process; however, all are based upon 4,4'-methylene bis(-phenylisocyanate) as the isocyanate. Aromatic diamines having alkyl group constitutents ortho to each amine group are used as the chain extender. An example of the aromatic diamines suited for the process was diethyltoluenediamine.

U.S. Pat. No. 4,048,105 shows the production of polyurethane-urea elastomers from an aromatic diisocyanate, polyol and aromatic diamine chain extender. The elastomer is formed by reacting a prepolymer of aromatic diisocyanate and alkane diol with a polyol blend containing long chain polyol.

U.S. Pat. No. 4,440,952 discloses the use of a monoisopropyl derivative of toluenediamine as a chain extender for polyurethane-urea systems where the isopropyl group is ortho to an amine group.

U.S. Pat. No. 4,487,908 discloses the production of reaction injected molded urethane elastomers from organic polyisocyanates, polyols and aromatic diamine chain extenders. Alkenyl succinic anhydrides are preferred as a class of additives to improve the green strength of the polymer.

There are numerous patents which show the use of various aromatic diamines in preparing polyurethane elastomers and foams and these include:

U.S. Pat. No. 3,752,790 which shows a chlorinated toluenediamine as an aromatic diamine for cross-linking urethane systems. The electronegativity of the chlorine atom deactivates the aromatic ring and tends to extend or delay the reaction rate. The chlorotoluenediamine derivative is suited for the production of large parts which require a formulation having a long "pot life".

U.S. Pat. No. 4,365,051 which dislcoses various aromatic amine esters, and nitriles as urethane cross-linkers. Examples include various alkyl diamino tertiary-butylbenzoates or diamino tertiary alkylbenzonitriles. In contrast to U.S. Pat. Nos. 4,218,543 and 4,374,210 the nitrile and benzoate groups are meta to the amine and not ortho to the amine group. The nitrile and ester groups deactivate the aromatic ring and thereby extend the pot life of the formulation.

U.S. Pat. No. 3,428,610 which discloses the production of cross-linked polyurethanes utilizing alkylated toluenediamine where the alkyl group is ortho to the amine. Numerous organic polyisocyanates and polyols are suggested as being suited for cross-linking by the alkyl aromatic toluenediamine chain extender.

U.S. Pat. No. 3,846,351 which discloses the utilization of secondary aromatic alkyl diamines as chain extenders and foam catalysts for polyurethane-urea elastomer forming compositions. N,N'-di-sec-butyl-p-phenylenediamine is one example of an amine having chain extending and catalytic activities.

European Pat. No. 0,069,286 discloses cellular polyurethanes which include alkyl-substituted phenylenediamines as chain extending agents. All diamines shown have an alkyl substituent in each ortho position to the amine.

U.S. Pat. No. 3,285,879 which discloses the utilization of N-mono-alkylaromatic diamines as chain extending agents for polyurethane-urea elastomers; and U.S. Pat. No. 4,428,690, although nor prior art to this application, discloses a process for producing polyurethane-urea elastomers utilizing tertiary-butylbenzenediamine as a chain extender for the polyurethane-urea formulation. Tertiary-butylbenzenediamine was indicated as being a chain extender diamine which imparted longer "pot life" to a urethane formulation and a good tensile modulus to the resulting urethane-urea polymer.

SUMMARY OF THE INVENTION

This invention pertains to an improvement in a process for forming polyurethane-urea elastomers by reacting an organic polyisocyanate with an organic compound having a molecular weight from about 400 to 12,000 and containing at least two Zerewitinoff hydrogen atoms and an aromatic diamine as a chain extending agent. The improvement resides in including a mono-tertiary-alkyltoluenediamine derivative where the tertiary-alkyl group is ortho to an amine as a chain extending agent or component thereof. Mono-tertiary-butyl-toluenediamine is an example of a preferred substituted diamine.

Numerous advantages are obtained when utilizing mono-tertiary-alkyltoluenediamine as an aromatic chain extending agent or as a component of a diamine chain extending system for forming polyurethane-urea elastomers and these include:

an extension in pot life of polyurethane-urea elastomer molding compositions as compared to unsubstituted aromatic diamines as well as both mono and dialkyl substituted toluenediamine system;

formation of polyurethane-urea elastomers which have good physical properties including reduced heat sag;

reduced handling and processing problems since there is an ability to use an aromatic diamine chain extending agent which has shown no mutagenic activity in the Ames test;

a variety of processing freedoms in forming castable elastomers from toluenediisocyanate systems;

flexibility in molding processes using RIM techniques, and an ability to utilize high levels of chain extender based on polyol permitting one to obtain an elastomer having reduced heat sag without skin-core delamination.

THE DRAWINGS

DETAILED DESCRIPTION OF THE INVENTION

Figure 1:
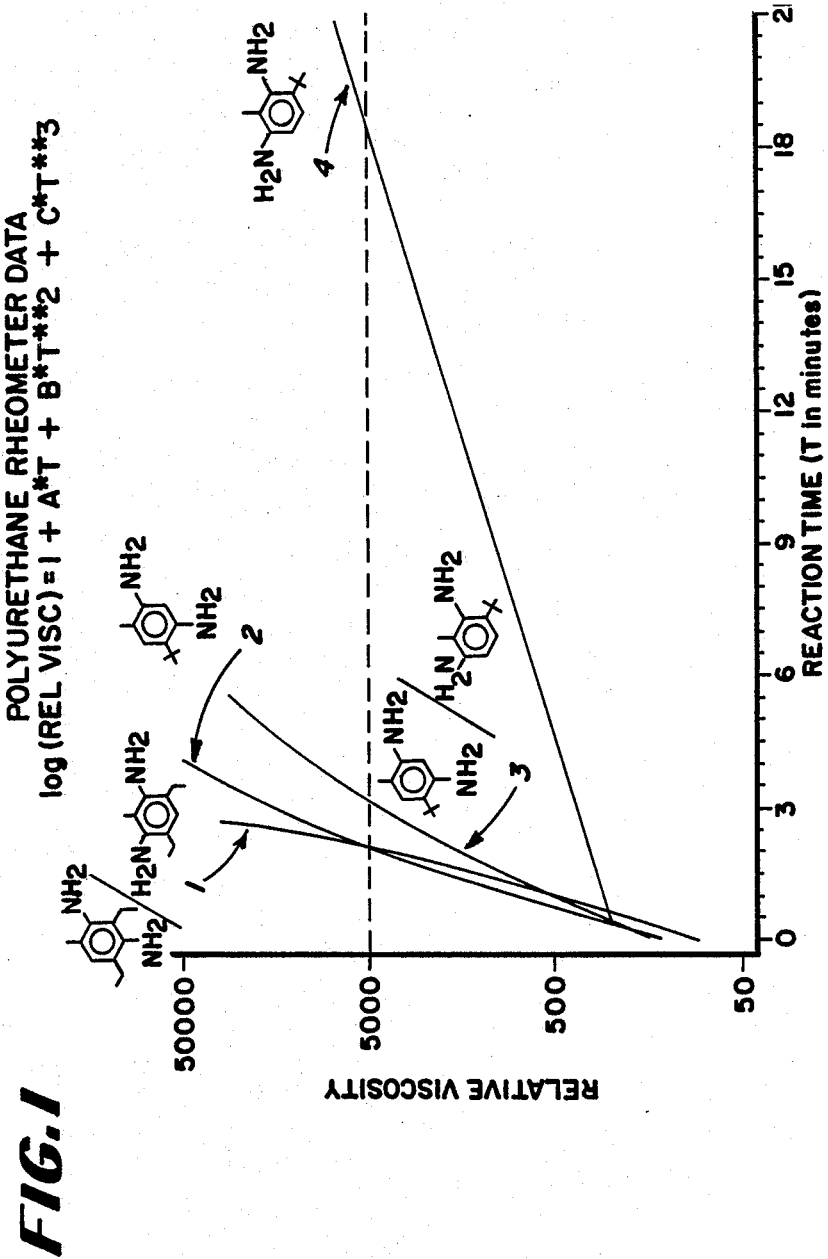
FIGS. 1–2 are plots of rheological data for test aromatic diamines expressed as a function of time.

In accordance with the general practice of the invention, the polyurethane-urea elastomers are formed by reaction (a) an organic polyisocyanate with (b) a compound having active hydrogen atoms as determined by the Zerewitinoff method and (c) an aromatic amine chain extender.

Polyisocyanate reactants (a) used as starting components for the urethane urea elastomers may be any of the aliphatic, cycloaliphatic, araliphatic, aromatic or heterocyclic isocyanates which are commonly used in the industry to form the polyurethane-urea elastomer systems. As a general rule it is particularly preferred to use the aromatic polyisocyanates with the chain extender system described herein and these include toluene, 2,4- and 2,6-diisocyanate; others include phenyldiisocyanate, polyphenyl-polymethylene polyisocyanate, 4,4'-methylene bis(phenylisocyanate), naphthalene-1,5-diisocyanate, cyclohexenyl-1,4-diisocyanate, dicyclohexylmethane-4,4-diisocyanate bis(3-methyl-3-isocyanatophenyl)methane, dianisidine diisocyanate and the like. Of these, 4,4'-methylene bis(phenylisocyanate) (MDI) is preferred; it has excellent RIM processing characteristics and presents less risk to hanlers of formulations.

Reactants (b) used for forming the polyurethane-urea elastomer are compounds which have at least two active Zerewitinoff hydrogen atoms. These typically are polyols, e.g. polyether, aminated polyether ployols and polyester polyols. The molecular weight of these compounds range from about 400 to 10,000, and preferably, the molecular weight of the polyol ranges from 1,000 to about 6,000. Examples of polyols suited for forming polyurethane elastomers include polyether polyols such as poly(propylene glycol), poly(ethylene glycol); poly(tetramethylene glycol); polyester polyols which are formed by reacting polycarboxylic acids with various polyols. These systems are well known in the art and include, for example, systems derived from polycarboxylic acids such as succinic acid, adipic acid, phthalic acid, isophthalic acid and polyols such as glycerol, ethylene glycol, propylene glycol, 1,4-butane diol, trimethylolpropane, and pentaerythritol. Also, polyether polyols can be reacted with the polycarboxylic acids to form the polyester polyols.

In the practice of this invention the aromatic amine chain extender is mono-tertiary-alkyltoluenediamine where the tertiary alkyl group is ortho to an amine group. Substituted derivatives may also be used. It is used as the chain extender for the polyurethane urea elastomer or as a component of the chain extender to provide urea groups within the elastomer. The small chain extender groups form "hard" segments in the elastomer and improve the structural stability and tensile modulus of the resulting polyurethane-urea elastomer. For purposes of the invention, at least 50% of the equivalent weight and preferably 100% of the equivalent weight of the chain extending agent in the formulation is mono-tertiary-butyltoluenediamine. It is possible in many cases that up to 50% of the equivalent weight of the chain extending system can comprise other aromatic diamines. The type and ratio of chain extending agent is selected on the basis of the properties desired, e.g. whether one desires a fast or slow reaction rate etc. Short or long chain polyols can also be formulated with mono-tert-alkyl toluenediamine to produce a chain extender mix. Such polyols include ethylene glycol, propylene glycol, butane diol, glycerol and others conventionally used. The long chain polyols generally are not suited as a component for the chain extending system but are used for formulating the prepolymer. Typically, if a polyol is used as a component of the chain extender system, at least 25% and preferably at least 75% of the free NCO equivalents will be supplied from tert-alkyltoluenediamine. If the "one shot" method is used the free NCO content is based upon the available NCO after reaction of the aromatic diisocyanate and organic compounds having active hydrogen atoms.

The mono-tertiary-alkyltoluenediamine compounds used in the process of this invention include those represented by the formulas:

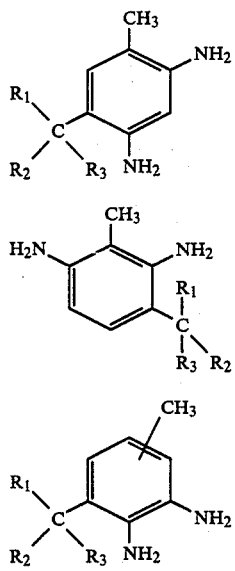

wherein $R_1$, $R_2$ and $R_3$ are $C_{1-3}$ alkyl groups or $R_2$ and $R_3$ are combined to form $C_{5-6}$ membered ring.

The primary differences between the compositions described herein and those in the prior art, are the composition has only one mono alkyl group, the monoalkyl group is ortho to one amino group and the alkyl substituent is a tert-alkyl radical. As is shown, the aromatic diamines include either the 2,4-, the 2,6-, the 2,3 and 3,4-diaminotoluene derivatives. The methyl radical is in the 1 position.

The compounds of this invention are synthesized by alkylating aromatic toluenediamine compounds as opposed to the technique of alkylating aromatic hydrocarbons followed by amination through a nitration route. It is because the alkylation is effected via the aromatic amine that one can locate the alkyl group in the aromatic composition ortho to an amine group. When alkylation is effected first, i.e., where alkylation is effected on an aromatic hydrocarbon or a dinitroaromatic hydrocarbon as opposed to an aromatic amine, the alkyl group is directed to the position para to the methyl group. Substituted toluenediamines having an available position ortho to an amine may be alkylated. The substituent, inert to the NCO content of the isocyanate, may alter reactivity of the aromatic diamine as compared to the unsubstituted tert-alkyltoluenediamine. Examples of substituents include halogen atoms, e.g., a chlorine atom, ester group and so forth. Preferred systems have no substituents.

Although much of the art in the manufacture of alkylated aromatic diamines uses a homogeneous catalyst system, such techniques have not been particularly adaptable for the manufacture of the 1-methyl-tert-alkyl derivatives, e.g., 1-methyl-5-tert-butyl-phenylene-2,4-diamine or the 1-methyl-3-tert-butylphenylene-2,6-diamine compositions. It is our opinion, many of the homogeneous catalyst systems do not have sufficient activity to permit the introduction of the tert-butyl group onto the aromatic ring. A lead reference to the use of homogeneous catalysts is J. Org. Chem. 22, 693 (1957). In contrast to the prior art the tert-alkyl toluenediamines are prepared by reacting $C_4$–$C_{10}$ olefins; e.g., isobutylene, isoamylene, 1-methylcyclopentene, 1-methylcyclohexane, 2-methyl-2-butene with toluenediamine in the presence of an acidic catalyst under liquid or gas phase conditions at a temperature from about 100° to 250° C. Pressures suited for effecting the reaction will range from about 15 to 2000 psig and preferably 100 to 1000 psig. The reaction time is typically from 2 to 48 hours. Mole ratios of olefin, e.g., isobutylene to toluenediamine will be from about 1–10:1. A nitrogen or other inert gas purge typically is used to remove trace amounts of oxygen or water from the reactor as either will tend to interfere with the reaction. The reaction product is readily recovered by known methods. Initially, the catalyst is removed by filtration and the product separated, if desired, by distillation.

Acidic catalysts suited for practicing the invention are those which are solid phase; these include silica-alumina, montmorillonite, bleaching earths, kaolin, and zeolites e.g. natural or synthetic. Of those catalytic materials, silica-alumina and the zeolites are preferred, particularly the hydrogen and rare earth exchanged mordenites or Y zeolites. Montmorillonite and silica-alumina can produce substantial amounts of the di-tert-butyltoluenediamine composition from the 2,6-toluenediamine isomer and this product can alter the reactivity of the mix if not separated. H-Y zeolite is particularly selective to the mono-tert-butyltoluenediamine product.

The alkylated amines may be used by themselves as a blend, e.g. a mixture of the 2,4 and 2,6-isomers, respectively, or the isomers may be used in combination with other isomers; e.g., the 2,3; 3,4; and 2,5 toluenediamine derivatives, and other aromatic diamines and alkylated diamines. A mixture of the tert-buryl isomer of the 2,4 and 2,6-diaminotoluene isomer in a weight ratio of from about 65–80% of the 2,4 and 20–35% of the 2,6- isomer is attractive. One reason is that a commercial feedstock of toluenediamine typically contains about 80% of the 2,4- isomer and 20% of the 2,6-isomer along with a small percent; e.g., 2–5% of a mixture of the 2,3 and 3,4 tert-alkylated derivatives. A second reason is that the mixture of isomers in a weight ratio of from 65–80% of the 5-tert-butyl-2,4-dimainotoluene isomer and 20–35% of the 3-tert-butyl-2,6-toluenediamine isomer is advantageous for RIM manufacture as the small amount of the 2,6-isomer extends the reaction time sufficiently to permit the molding of larger and more complex or more intricate parts than when using the 2,4- isomer alone or when using diethyltoluenediamine. In addition, the 80/20 mixture is a supercooled liquid (mp 38° C.) which permits greater flexibility in handling the formulation of the urethane. As can be seen from the drawings, the 3-tert-butyl-2,6-diaminotoluene isomer and the 5-tert-butyl-3,4-diamino toluene have a much slower activity in a urethane system than the 5-tert-butyl-2,4-diaminotoluene isomer. The former can be used individually in manufacturing many RIM parts when the 5-tert-butyl-2,4-diaminotoluene isomer cannot because of its reactivity.

A general method in forming the elastomer is to form a prepolymer containing free isocyanate groups, typically from 5 to 25 percent by weight free isocyanate groups and then react the prepolymer with a stoichiometric quantity of aromatic amine chain extending agent. In this technique, the percent free isocyanate content of the prepolymer within this range will vary depending upon the type of molding to be effected. In the manufacture of small, hard, molded parts higher levels of free isocyanate may be tolerated, e.g. from 15 to 23 percent by weight. In the manufacture of large, soft components a lower isocyanate content may be required, e.g. from 5 to 15 percent isocyanate by weight. As noted in U.S. Pat. No. 4,374,210 the prepolymer route has a processing advantage in that the amounts of reactants pumped from the machine are substantially equal.

Another technique used in formulating polyurethane-urea elastomers is referred to as the "one shot" technique. In this type of manufacture, all of the reactants are blended in a nozzle and immediately injected into a mold. This technique is drawn in U.S. Pat. No. 4,218,543.

Catalysts are generally essential to the manufacture of polyurethane-urea elastomers because without them it would not be possible within commercial time constraints to obtain a molding which sets rapidly and has the desired mechanical properties required of polyurethane-urea elastomers. Catalytic systems suited for catalyzing the isocyanate hydroxy reaction are known and generally include organic metal compounds such as organic tin compounds. Examples include tin II, salts of carboxylic acids such as tin II octoate, and tin (II) laurate. The dialkyl tin salts of carboxylic acids are also used in examples that include dibutyl tin dilaurate, dioctyl tin diacetate and dibutyl tin maleate. Other catalysts which may be included as a component include tertiaryamines such as triethylenediamine, triethylamine, N-methyl-N'-(dimethylaminoethyl)piperazine and N-ethylmorpholine. Tertiaryamines include triethanolamine, triisopropanolamine, N-methyl-diethanolamine and the like.

Catalysts are generally used in an amount from 0.01 to 10% by weight preferably 0.05 to about 1% by weight of the polyol present in the reaction system.

Polyurethane-urea elastomers may also be formulated with blowing agents for the purpose of adding cellular interior to the product. Blowing agents conventionally used include water or volatile organic systems which include acetone, methanol, halogen substituted alkanes such as chloroform, monofluorotrichloromethane, chlorodifluoromethane; and ethers such as diethylether.

The formulation may also include various surface active additives, foam stabilizers and cell regulators. Alkali metal or ammonium salts of sulfonic acids, e.g., dodecylbenzene sulfonic acid are examples of surface-active additives. Water soluble polyether siloxanes generally used as foam stabilizers and parafins of fatty alcohols or dimethylpolysiloxanes are used as cell regulators.

Mold release agents are utilized in manufacturing to facilitate removal of the cured polyurethane-urea elastomer from the mold. Conventional mold release agents can be used.

The following examples are provided to illustrate embodiments of the invention for synthesizing the alkylated aromatic diamines and to illustrate performance of these alkylated diamines in the manufacture of polyurethane-urea elastomer systems.

EXAMPLE 1

Synthesis of 3-tert-butyl-2,6-toluenediamine

Synthesis of the above recited ortho-tertiary-butyl-toluenediamine (hereinafter t-butyl TDA) was carried out in a 1 gallon stainless steel pressure vessel equipped with a mechanical stirrer. The vessel was charged with 150 gram portion of a powdered commercially available silica-alumina catalyst containing 13% alumina and 1500 grams (12.24 moles) of 2,6-toluenediamine. The autoclave was sealed and purged with nitrogen. A residual blanket of nitrogen was left in the autoclave, leaving the pressure of 16 psig. The contents of the reactor were heated to a temperature of 200° C. with constant agitation. Isobutylene was then introduced into the reactor and 870 grams or 15.5 moles were added over a 30 minute period resulting in an initial reaction of pressure of 970 psig. The reaction mixture was maintained at 200° C. for about 45 hours with constant agitation.

At the end of the 45 hour reaction time the contents were cooled to about 150° C. and agitation discontinued. The reactor then was vented and the contents removed from the reactor. The catalyst was removed from the reaction mixture by filtration.

The reaction product was analyzed by a gas chromatographic techniques and the following analysis was obtained:

|  | GC Area Percent |
| --- | --- |
| 2,6-toluenediamine | 30.72 |
| 2-(tert-butylamino)-6-aminotoluene | 3.87 |
| 3-tert-butyl-2,6-toluenediamine | 49.68 |
| 3,5-di-tert-butyl-2,6-toluenediamine | 12.93 |
| other tert-butylated products | 2.80 |

Both the mono and di-tert-butyltoluenediamine products were produced. The products can be separated by distillation thereby obtaining the 3-tert-butyl-2,6-toluenediamine isomer as a chain extender.

EXAMPLE 2

Synthesis of 5-t-butyl-2,4-toluenediamine.

A 300 cc Hastalloy C pressure vessel equipped with a mechanical stirrer was used for producing t-butyl-toluenediamine. Approximately 100 grams of 0.819 moles of 2,4-toluenediamine were charged to the vessel along with 5 grams of 36% aqueous hydrochloric acid. The vessel was sealed and purged with nitrogen, leaving a 33 psig nitrogen blanket. The vessel contents then were heated to 180° C. with continuous stirring. Isobutylene then was introduced into the reactor and 53.4 grams or 0.96 moles was added over 15 minutes. On addition of the isobutylene, the pressure in the reactor increased bo 766 psig. The reaction mixture was maintained at 180° C. for 24 hours with constant stirring. At the end of the 24 hour period the pressure had dropped to 524 psig. The contents were then cooled to 160° C. and stirring discontinued. At that time the reactor was vented and the reaction product analyzed for composition.

|  | GC Area Percent |
| --- | --- |
| 2,4-toluenediamine | 40.14 |
| 2-(tert-butylamino)-4-aminotoluene | 2.12 |
| 2-amino-4-(tert-butylamino)toluene | 14.68 |
| 5-tert-butyl-2,4-toluenediamine | 30.86 |
| di-tert-butylated products | 12.21 |

The 5-tert-butyl-2,4-toluenediamine isomer is recovered by distillation.

EXAMPLE 3

Preparation of 3-tert-butyl-2,6-toluenediamine

A 15.0 g. portion of powdered H-Y zeolite catalyst and 140.0 g. (1.15 mol) of 2,6-toluenediamine were charged to a 1000 cc Hastalloy pressure vessel equipped with a mechanical stirrer as was done in Example 2. The vessel was sealed with and purged with nitrogen leaving a residual 200 psig nitrogen blanket at room temperature. The contents were heated to 180° C. with stirring. Isobutylene (267 g., 4.76 mole) was then added to the reaction mixture over 20 minutes, resulting in an initial reaction pressure of 1100 psig. This provided a molar ratio of 4.1:1 isobutylene to toluenediamine. The reaction mixture was maintained at 180° C. for 30 hours with constant stirring. The reaction product was isolated by the procedure used in Example 2 and consisted of the following composition:

|  | GC area % |
| --- | --- |
| 2,6-toluenediamine | 19.98 |
| 2-(tert-butylamino)-6-aminotoluene | 10.45 |
| 3-tert-butyl-2,6-toluenediamine | 66.12 |
| di-tert-butylated products | 3.45 |

The results in terms of conversion and selectivity of the mono-tertiarybutyl toluenediamine isomer were better than that obtained for the conversion of the 2,6-diaminotoluene isomer in Example 1. The 3-tert-butyl-2,6-toluenediamine product was recovered by distillation.

An 80/20 mix of the 2,6-tBTDA isomer can be prepared substituting the 80/20 mix for the 2,6-tBTDA isomer in this example.

EXAMPLE 4

A series of polyurethane-urea elastomers utilizing various chain extenders was prepared and evaluated for pot life in a pot life test system for the purpose of determining the reactivity of the chain extenders in standard urethane formulations relative to one another. The polyurethane-urea elastomers were formulated by reacting a prepolymer of poly (1,4-oxytetramethylene) glycol end-capped with 2,4-toluene diisocyanate, the prepolymer having an NCO content generally from 5–7%, with the test candidate chain extender aromatic diamine and a diol. The nominal stoichiometric equivalent ratio of isocyanate to diamine chain extender to diol for each sample is 2:1.1. Commercially, the prepolymer is marketed under the trademark ADIPRENE L-167 by the E. I. duPont de Nemours Company and the poly (ε-caprolactone) diol marketed under the designation CAPA 200 by Interox Chemicals Limited.

The test system for measuring pot life comprised a heated test chamber for holding 7 grams of test sample at a constant temperature (50° C.) and was equipped with a vertical perforated piston. This piston moves up and down through the test sample in timed relationship. (The temperature rise due to the exothermic reaction is discounted.) The force necessary to move the piston through the polymer sample is measured in arbitrary units, and the relationship of the force is plotted as a function of time. The force-pot life relationship of the urethane system during cure then is correlated to known force-viscosity relationships for the urethane-urea systems.

Table 1 represents tabular data providing coefficients for an empirical model expressing the logarithm base 10 of viscosity as a third-power polynomial function of time for several chain extender systems. The coefficients apply to the equation:

$$\log (\text{viscosity}) = I + A \, (\text{time}) + B \, (\text{time})^2 + C \, (\text{time})^3$$

The coefficient of the first power term ("A") is a "quasi" reaction rate constant measuring initial reactivity. Smaller values in the "quasi" rate constant (A) indicate longer and desirable pot lives. The value T-5000 is the time in which the reaction product has a relative viscosity of 5000 units. Even though the value is an arbitrary value, that value is relevant for use in determining the performance of the test candidate in a RIM process or a cast elastomer process. For the molding of modest size parts, T-5000 may be about 2.5 minutes; whereas, the molding of large or intricate parts may require a T-5000 of greater than 5 minutes; e.g., 10 minutes.

Figure 2:
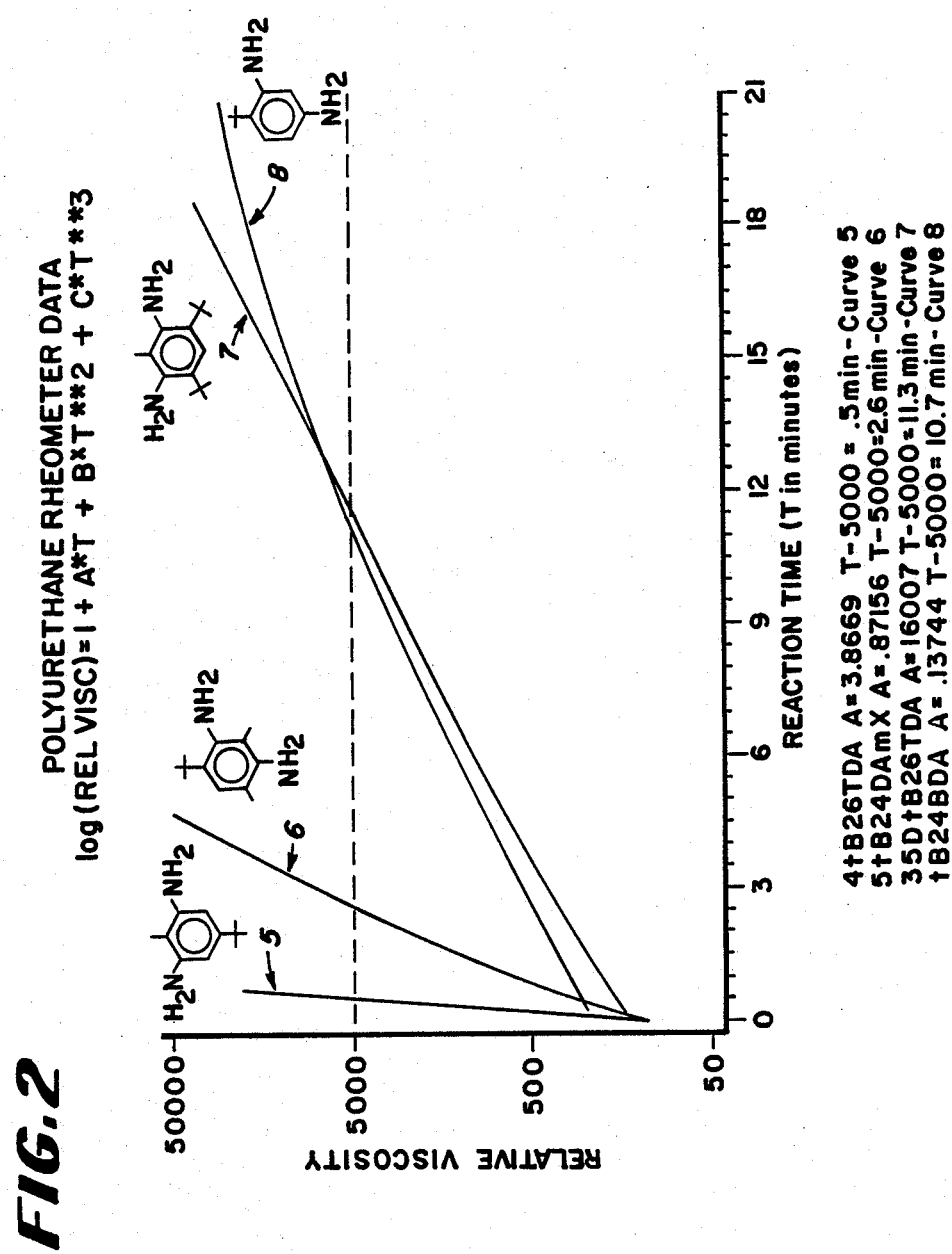
Figure 3:
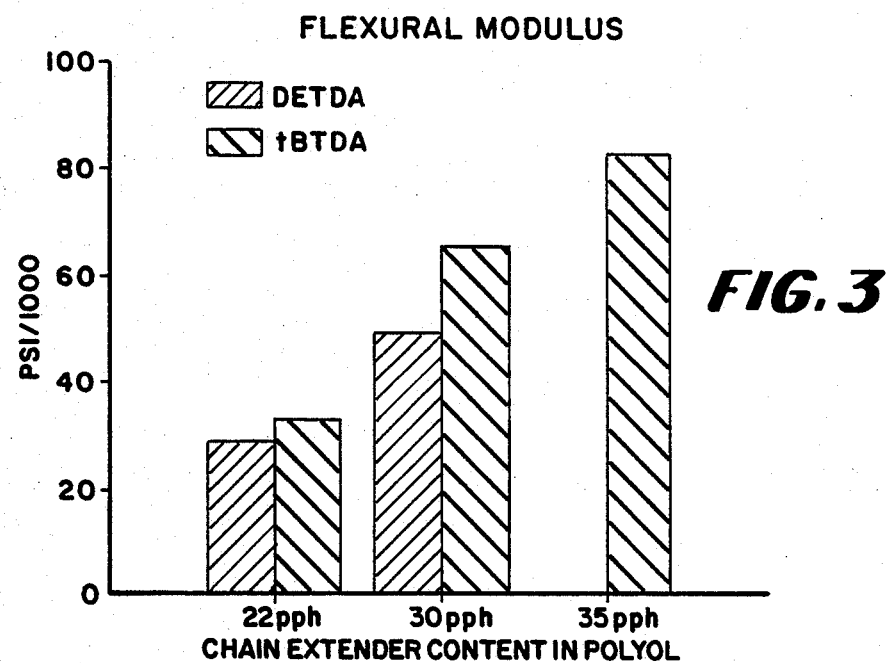
FIGS. 3 and 4 are plots of flexural modulus and thermal instability versus chain extender content in the polyol.
Figure 4:
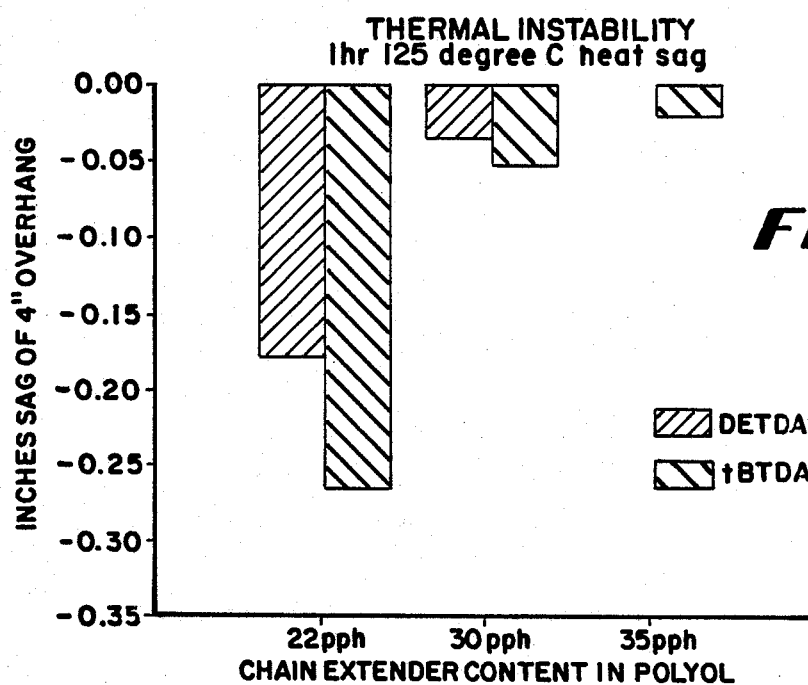

FIGS. 1 and 2 are plots of the results obtained for the test candidates. These graphs show the relative performance of the 5-tert-butyl- 2,4-diaminotoluene (5tB24TDA) and 3-tert-butyl-2,6-diaminotoluene isomers (3tB26TDA) in comparison to other aromatic diamine chain extenders, the 80/20 mix of tBTDA and the di-tert-toluenediamine products. As can be noted from FIG. 1, 3tB26TDA (curve 4) has a relatively linear buildup of viscosity and is substantially slower in reactivity than the prior art standard diethyltoluenediamine (DETDA). The 80/20 mix (curve 2) is also slower than DETDA (curve 1) and it is a liquid. On the either hand the di-tert-2,6-isomer is much faster than the mono tert isomer. (Compare T-5000 in FIG. 1 to T-5000 in FIG. 2.) The mono tert butyl-2,4-diamino-meta-xylene isomer is much faster reacting than the 80/20 mix or the 2,6-isomer itself.

In summary, counterbalancing steric retardation and electron-donation effects are illustrated in FIGS. 1 and 2. When the 2,6-TDA isomer is ortho-alkylated with isobutylene not once, but twice, the reactivity in polyurethane/urea formulations increases rather than decreases. For example, the T-5000 decreases from 17.8 minutes for the monosubstituted 2,6-TDA to 11.3 minutes for the disubstituted product. The steric blockage around the less reactive amine group in each species is the same (—$NH_2$ accompanied by —$CH_3$ and —$CH(CH_3)_3$ nearest neighbors), but in 35tB26TDA there is the extra electron donation offered by the second —$C(CH_3)_3$ alkyl group to accelerate reaction. This is also demonstrated for 5-tert-butyl-2,4-benzenediamine (T-5000=10.7 minutes) versus 5-tert-butyl-2,4-diamino-meta-xylene (T-5000=2.6 minutes). For the meta-xylene derivative the effect of steric blocking by one tert-butyl group is overcome by the amine reactivity activation provided by the addition of the two methyl group ring substituents. When the tert-butyl group is not ortho to the reacting amine substituent, there is only activation provided by the alkyl group substituent. This is evidenced by the fact the 4-tert-butyl-2,6-toluenediamine isomer prepared by nitration/reduction of para-tert-butyltoluene reacts very fast, with a T-5000 of only 0.5 minutes and an A term of 3.87.

TABLE I

Empirical Model of Pot Life
$\log(\text{viscosity}) = I + A(\text{time}) + B(\text{time})^2 + C(\text{time})^3$

| Run | Chain Extender | | Curve FIG. 1 + 2 | I | A | B | C | T-5000 (minutes) |
|---|---|---|---|---|---|---|---|---|
| 1 | ditheyltoluenediamine (80/20 commercial isomer mix) | (DETDA) | 1 | 1.889 | .8092 | −.16624 | .0649 | 2.2 |
| 2 | 5-tertiarybutyl-2,4-toluenediamine | (5tB24TDA) | 2 | 2.029 | .7697 | −.00160 | −.00780 | 2.2 |
| 3 | tertiarybutyltoluenediamine (80/20 isomer mix) | (tBTDA mix) | 3 | 2.132 | .5029 | −.00424 | −.00237 | 3.2 |
| 4 | 3-tertiarybutyl-2,6-toluenediamine | (3tB26TDA) | 4 | 2.358 | .06721 | .000606 | −.0000184 | 17.8 |
| 5 | 5-tertiarybutyl-2,4-diaminometaxylene | (5tB24DamX) | 6 | 2.022 | .8716 | −.126 | .0124 | 2.6 |
| 6 | 3,5-ditertiarybutyl-2,6-toluenediamine | (35DtB26TDA) | 7 | 2.155 | .1601 | −.00368 | −.000106 | 11.3 |
| 7 | tertiarybutyl-2,4-benzenediamine | (tBBDA) | 8 | 2.354 | .1374 | −.00131 | −.0000268 | 10.7 |
| 8 | 4-tertiary butyl-2,6-toluenediamine | (4tB26TDA) | 5 | 1.916 | 3.8669 | −3.41 | 2.41 | 0.54 |

EXAMPLE 6

A series of polyurethane-urea cost elastomer samples was developed for physical testing using hand-mix techniques. More specifically, a conventional isocyanate capped prepolymer (Adiprene L-167) was degassed at 90°–100° C. under a pressure of 5–14 mm mercury. When bubbling ceased, the sample was ready for use. A preselected amount of isocyanate prepolymer at 75° C. and atmospheric pressure was then mixed with the chain extenders. The chain extenders employed were those which had a T-5000 time greater than 10 minutes listed in Example 4. The chain extender was mixed with the prepolymer and the resulting mixture poured into an aluminum mold and cured at 100° C. at 2500 psig in a hydraulic press. After two hours the samples were demolded and cured in an air oven for 22 hours at 100° C. Postcuring was effected at ambient conditions 25°–30° C. for seven days. Prior to testing, samples were conditioned at 23°±2° C. at 50±5 relative humidity for 24 hours.

Table 2 provides test data with respect to the physical properties in terms of tensile modulus, tensile strength at break, elongation at break, tear resistance and durometer hardness measured in accordance with ASTM methods. More specifically, the tensile strength at a given elongation and at break was measured in accordance with ASTM D1708; tear resistance according to ASTM D624 (Die C) and durometer hardness according to ASTM D2240;

TABLE 2

ADIPRENE 167 CAST POLYURETHANES

| Chain Extender | MOCA | Cl-TDA | tBBDA | 3tB26TDA | 35DtB26TDA |
|---|---|---|---|---|---|
| NCO index | 1.05 | 1.04 | 1.05 | .95 | 1.05 |
| Shore A Hardness | 90 | 90 | 93 | 94 | 93 |
| Shore D Hardness | 47 | 39 | 40 | 44 | 43 |
| 100% tensile (psi) | 1680 | 1360 | 840 | 1520 | 1410 |
| 200% tensile (psi) | 2390 | 2080 | 1330 | 2380 | 2310 |
| 300% tensile (psi) | 3320 | 2940 | 2000 | 3440 | 3270 |
| Ratio 300/100 tensile | 1.98 | 2.16 | 2.38 | 2.26 | 2.32 |
| break tensile (psi) | 4840 | 3050 | 5180 | 5490 | 6540 |
| % elongation (%) | 440 | 320 | 630 | 480 | 620 |
| tear resistance (pli) | 700 | 530 | 490 | 660 | 720 |

MOCA = methylenebis(orthochloro-aniline)
Cl-TDA = chlorotoluenediamine
tBBDA = tertiarybutyl-2,4-benzenediamine
3tB26TDA = 3-tertiarybutyl-2,6-toluenediamine
35Dt26TDA = 3,5-ditertiary butyl-2,6-toluenediamine
These data show that the percent elongation for the t-butyl toluenediamine systems are superior to MOCA and Cl-TDA. DETDA and the 2,4-tBTDA isomer generaly are too reactive to be used in preparing cast elastomers for most applications.

EXAMPLE 7

A series of polyurethane-urea elastomer samples was developed for physical testing using reaction injection molding (RIM) techniques. In this process diethyltoluenediamine isomers (DETDA 80/20 mixture of 2,4 and 2,6 isomers), a conventional chain extender for RIM manufacture, were compared against an 80/20 mixture of the 2,4- and 2,6-mono-tert-butyltoluenediamine isomers, respectively. Another series of evaluations were made with respect to the specific tert-butyl-toluenediamine isomers against DETDA. The processes for urethane synthesis were the same and direct comparisons were made with various polyols and isocyanates.

More particularly, the reaction injection molded elastomers were prepared using a model SA8-20 laboratory machine (LIM Kunststoff Technologie Gmbh, Kittsee, Austria) suitable for processing two component mixtures. The machine utilized two 10–30 cc/min metering pumps for components "A" (methylenediphenyldiisocyanate, MDI) and "B" (polyol plus chain extender plus catalysts) and these pumps are driven synchronously by sprocket wheels in proportion to the mixture to be processed by means of a variable speed (50–250 rpm) motor. Components A and B are conveyed into a mixing chamber by individually controlled compressed air actuated valves and a high spped rotor, continuously adjustable from 10,000 to 18,000 rpm using a frequency transformer, mixes the components. After mixing, the pump block and mixing head are automatically advanced to a stationary mold by compressed air. Stream temperatures can be controlled but were nominally 50° C.

Molds were thermostatted before mounting on a jig to which the mixing head was conveyed during the injection molding operation. These molds were 100×200×2 mm and 200×200×3 mm cavities in nominally 26×27×4 cm aluminum and were treated with mold release agents before each injection. An isocyanate index of 1.05 was sought for all elastomers in some instances and checked by machine calibration of unmixed A and B components through sampling ports. A 0.94 isocyanate was sought in other instances to determine the effect of isocyanate on the physical properties of the urethane-urea elasomer. After injection the mixing rotor was washed in situ with dioctylphthalate, blown clean with nitrogen and readied for the next injection shot as the mold was unmounted and opened.

The plaques were cured for 12 hours at 60° C. or for one hour at 125° C. as indicated in the tables, freed of mold release agent, and conditioned for replicate hardness, tensile and tear tests on 2 mm thick pieces by exposure at 23±2° C. at 50±5% relative humidity.

Physical properties were measured in accordance with ASTM procedures, these include: hardness (ASTM D2240) and tensile (ASTM D1708) (measurements are the average of five determinations each), tear resistance (ASTM D624, die C) (the average of three determinations). The additional variable of yield tensile is reported for the crosslinked RIM elastomers due to the characteristic shape of the Instron stress-strain curve. Also tabulated are flexural modulus and maximum stress (ASTM D1708) (determined on each of five 1"×3" specimens from the 3 mm plaques) and sag, a measure of thermal stability (ASTM D3769) measured on a 100 mm overhang using 3 mm thick plaque with the samples at 4 inch overhang. The following tables 3, 4 and 5 provide results of these tests.

TABLE 3

POLYURETHANES from DETDA/tBTDA

| CH_EX | DETDA | tBTDA | DETDA | tBTDA | DETDA | tBTDA | DETDA | tBTDA |
|---|---|---|---|---|---|---|---|---|
| CH_EX pph | 25 | | 25 | | 25 | | 22 | |
| POLYOL | VORANOL 5148 | | NIAX 11-27 | | FOMREZ A-1228 | | VORANOL 5815 | |
| ISOCYANATE | ISONATE 181 | | ISONATE 181 | | ISONATE 181 | | ISONATE 181 | |
| NCO index | 1.05 | 1.04 | 1.05 | 1.04 | 1.05 | 1.04 | 1.04 | 1.04 |
| Catalyst_1 | 33-LV | 33-LV | | 33-LV | 33-LV | 33-LV | 33-LV | 33-LV |
| Cat_1 pph | .063 | .063 | . | .125 | .050 | .050 | .050 | .050 |
| Catalyst_2 | T-12 | T-12 | T-12 | T-12 | T-12 | T-12 | T-12 | T-12 |
| Cat_2 pph | .063 | .063 | .125 | .125 | .050 | .050 | .050 | .050 |
| A Stream temp °C. | 39.9 | 41.4 | 42.9 | 42.8 | 39.3 | 42.4 | 40.8 | 44.6 |
| B Stream temp °C. | 39.3 | 45.6 | 41.0 | 40.0 | 45.1 | 41.0 | 44.6 | 40.8 |
| Mixing head temp °C. | 39.6 | 39.9 | 39.9 | 40.3 | 40.2 | 40.1 | 40.6 | 40.6 |
| 2 mm Shot time (sec) | 2.35 | 2.48 | 2.78 | 2.82 | 2.66 | 2.59 | 2.42 | 2.69 |
| 3 mm Shot time (sec) | 2.06 | 3.19 | 3.35 | 3.49 | 3.30 | 3.33 | 3.16 | 3.35 |
| Shore A Hardness | 98 | 96 | 96 | 97 | 98 | 98 | 96 | 97 |
| Shore D Hardness | 64 | 64 | 61 | 66 | 63 | 65 | 55 | 59 |
| 100% tensile (psi) | 2060 | 1840 | 2000 | 1720 | 2220 | 1950 | 1850 | 1530 |
| 200% tensile (psi) | 2650 | 2180 | 2400 | 1880 | 2820 | 2390 | 2370 | 1950 |
| 300% tensile (psi) | 3290 | 2720 | 2860 | 2130 | 3580 | 3000 | 3000 | 2500 |
| yeild tensile (psi) | 2040 | 2020 | 1980 | 1960 | 2210 | 2160 | 1660 | 1660 |
| break tensile (psi) | 3840 | 3740 | 3520 | 2720 | 3700 | 3740 | 3470 | 3550 |
| % elongation (%) | 340 | 450 | 440 | 530 | 320 | 430 | 370 | 480 |
| tear resistance (pli) | 760 | 680 | 740 | 710 | 770 | 740 | 680 | 630 |
| maximum stress (psi) | 2210 | 2330 | 2070 | 2510 | 2210 | 2180 | 1680 | 1740 |
| flexural modulus (psi) | 46500 | 47000 | 44100 | 55500 | 46300 | 46000 | 35800 | 35900 |
| sag (125° C., 1 hr) (in) | .89 | 1.33 | .72 | 1.08 | .57 | 1.26 | .64 | 1.28 | glossary:
DETDA = 80/20 3,5-diethyl-2,4-toluenediamine/3,5-diethyl-2,6-toluenediamine, eq wt. 89.1 g/eq
tBTDA = 80/20 5-tertiarybutyl-2,4-toluenediamine/3-tertiarybutyl-2,6-toluenediamine, eq wt. 89.1 g/eq
VORANOL 5148 = Dow polyether polyol; hydroxyl# = 23.1, $H_2O$ = .023%, corrected eq. wt. = 2286 g/eq
NIAX 11-27 = Union Carbide polyether polyol; hydroxyl# = 27.0, $H_2O$ = .01%, corrected eq. wt. = 2031 g/eq
FOMREZ A-1228 = Witco polyether polyol; hydroxyl# = 27.9, $H_2O$ = .03%, corrected eq. wt. = 1884 g/eq
VORANOL 5815 = Dow polyether polyol; hydroxyl# = 27.6, $H_2O$ = .04%, corrected eq. wt. = 1864 g/eq
ISONATE 181 = Upjohn liquid modified methylenediphenyldiisocyanate, eq. wt. 183 g/eq

TABLE 4

POLYURETHANES from DETDA/tBTDA

| CH_EX | DETDA | | tBTDA | | 5tB24TDA | | 3tB26TDA | |
|---|---|---|---|---|---|---|---|---|
| CH_EX pph | 22 | | 22 | | 22 | | 22 | |
| POLYOL | VORANOL 5815 | | VORANOL 5815 | | VORANOL 5815 | | VORANOL 5815 | |
| ISOCYANATE | ISONATE 181 | | ISONATE 181 | | ISONATE 181 | | ISONATE 181 | |
| NCO index | .94 | 1.04 | .94 | 1.04 | .93 | 1.06 | .96 | 1.04 |
| Catalyst_1 | 33-LV | 33-LV | 33-LV | 33-LV | 33-LV | 33-LV | 33-LV | 33-LV |
| Cat_1 pph | .050 | .050 | .050 | .050 | .050 | .050 | .050 | .050 |
| Catalyst_2 | T-12 | T-12 | T-12 | T-12 | T-12 | T-12 | T-12 | T-12 |
| Cat_2 pph | .050 | .050 | .125 | .125 | .050 | .050 | .050 | .050 |
| A Stream temp °C. | 40.6 | 40.8 | 40.6 | 44.6 | 43.6 | 46.6 | 45.0 | 47.3 |
| B Stream temp °C. | 41.6 | 44.6 | 44.0 | 40.8 | 58.7 | 61.9 | 65.0 | 57.6 |
| Mixing head temp °C. | 40.2 | 40.6 | 40.4 | 41.2 | 40.4 | 40.1 | 41.0 | 40.6 |
| 2 mm Shot time (sec) | 2.33 | 2.42 | 2.42 | 2.69 | 2.46 | 2.58 | 2.41 | 2.55 |
| 3 mm Shot time (sec) | 3.27 | 3.21 | 2.96 | 3.35 | 3.11 | 3.29 | 3.03 | . |
| Shore A Hardness | 96 | 96 | 98 | 97 | 97 | 97 | 97 | 97 |
| Shore D Hardness | 52 | 55 | 56 | 59 | 59 | 60 | 58 | 60 |
| 100% tensile (psi) | 1460 | 1850 | 1250 | 1520 | 1320 | 1570 | 1420 | 1720 |
| 200% tensile (psi) | 1770 | 2370 | 1540 | 1940 | 1650 | 2000 | 1750 | 2180 |
| 300% tensile (psi) | 2110 | 3000 | 1910 | 2480 | 2080 | 2540 | 2130 | 2760 |
| yield tensile (psi) | 1360 | 1660 | 1440 | 1650 | 1520 | 1720 | 1650 | 1910 |
| break tensile (psi) | 2720 | 3470 | 2790 | 3530 | 3150 | 3630 | 2560 | 2920 |
| % elongation (%) | 470 | 370 | 530 | 480 | 540 | 490 | 410 | 340 |

TABLE 4-continued

| CH_EX | POLYURETHANES from DETDA/tBTDA | | | | | | | |
|---|---|---|---|---|---|---|---|---|
| | DETDA | | tBTDA | | 5tB24TDA | | 3tB26TDA | |
| tear resistance (pli) | 600 | 680 | 600 | 630 | 590 | 660 | 600 | 650 |
| maximum stress (psi) | 1340 | 1680 | 1330 | 1740 | 1100 | 1370 | 1160 | 1600 |
| flexural modulus (psi) | 28500 | 35800 | 27400 | 35900 | 22200 | 26900 | 23600 | 30300 |
| sag (125° C. 1 hr) (in) | 385 | .64 | 1.96 | 1.28 | 1.46 | 1.02 | 2.68 | 2.11 | glossary:
DETDA = 80/20 3,5-diethyl-2,4-toluenediamine/3,5-diethyl-2,6-toluenediamine, eq wt. 89.1 g/eqDETDA
tBTDA = 80/20 5-tertiarybutyl-2,4-toluenediamine/3-tertiarybutyl-2,6-toluenediamine, eq wt. 89.1 g/eq
5tB24TDA = 5-tertiarybutyl-2,4-toluenediamine, eq wt. 89.1 q/eq
3tB26TDA = 3-tertiarybutyl-2,6-toluenediamine, eq wt. 89.1 g/eq
VORANOL 5815 = Dow polyether polyol; hydroxyl# = 27.6, $H_2O$ = .04%, corrected eq. wt. = 1864 g/eq
ISONATE 181 = Upjohn liquid modified methylenediphenyldiisocyanate, eq. wt. 183 g/eq

TABLE 5

| CH_EX | POLYURETHANES from DETDA/tBTDA | | | | | | | |
|---|---|---|---|---|---|---|---|---|
| | DETDA | tBTDA/L | tBTDA/P | DETDA | tBTDA | tBTDA | | |
| CH_EX pph | 22 | | | 30 | | 35 | | |
| POLYOL | VORANOL 5815 | | | VORANOL 5815 | | VORANOL 5815 | | |
| ISOCYANATE | ISONATE 181 | | | ISONATE 181 | | ISONATE 181 | | |
| NCO index | 1.02 | 1.02 | 1.02 | 1.05 | 1.05 | .94 | 1.00 | 1.05 |
| Catalyst_1 | 33-LV | 33-LV | 33-LV | 33-LV | 33-LV | 33-LV | 33-LV | 33-LV |
| Cat_1 pph | .05 | .05 | .05 | .05 | .05 | .05 | .05 | .05 |
| Catalyst_2 | T-12 | T-12 | T-12 | T-12 | T-12 | T-12 | T-12 | T-12 |
| Cat_2 pph | .05 | .05 | .05 | .05 | .05 | .05 | .05 | .05 |
| A Stream temp °C. | 50.4 | 58.2 | 56.2 | 53.6 | 52.6 | 54.6 | 54.5 | 55.2 |
| B Stream temp °C. | 49.6 | 47.9 | 51.8 | 50.8 | 49.9 | 49.8 | 49.3 | 49.2 |
| Mixing head temp °C. | 49.9 | 49.4 | 50.2 | 50.0 | 49.8 | 49.3 | 49.8 | 49.6 |
| 2 mm Shot time (sec) | . | 3.74 | 3.32 | 3.68 | 3.39 | 2.58 | 3.45 | 3.41 |
| 3 mm Shot time (sec) | 4.19 | 4.92 | 4.51 | 4.72 | 4.60 | 4.35 | 4.45 | 4.27 |
| Shore A Hardness | 96 | 96 | 96 | 97 | 97 | 97 | 97 | 98 |
| Shore D Hardness | 53 | 56 | 57 | 65 | 67 | 69 | 71 | 72 |
| 100% tensile (psi) | 2200 | 1850 | 1740 | 3180 | 2590 | 2780 | 2950 | 3280 |
| 200% tensile (psi) | 2910 | 2490 | 2340 | 4120 | 3230 | 3270 | 3550 | 3990 |
| 300% tensile (psi) | 3710 | 3200 | 3020 | . | 4050 | 3920 | 4370 | . |
| yield tensile (psi) | . | 1710 | 1510 | . | 2440 | 2650 | 2780 | 3040 |
| break tensile (psi) | 4370 | 3880 | 3620 | 4060 | 4420 | 4140 | 4000 | 4310 |
| % elongation (%) | 380 | 390 | 200 | 350 | 340 | 260 | 240 | |
| tear resistance (pli) | 680 | 670 | 630 | 810 | 830 | 860 | 850 | 810 |
| maximum stress (psi) | 1550 | 1700 | 1540 | 2390 | 3030 | 3480 | 3650 | 3930 |
| flexural modulus (psi) | 29200 | 34200 | 32700 | 49400 | 65100 | 72200 | 76400 | 82100 |
| sag (125° C. 1 hr) (in) | .18 | .33 | .20 | .038 | .055 | .059 | .047 | .024 |

All test pieces were made using Upjohn diisocyanate and Dow polyol. Catalysts were Dabco 33-LV triethylene diamine in propylene glycol and M&T T-12 dibutyldilaurate, each at .05 wt % of polyol. Stream temperatures were a nominal 50° C., demold time 2-3 minutes and postcure 1 hour at 125° C. Tensile and tear data are from 2 mm thick 200 mm × 200 mm plaques, flex modulus and sag from 3 mm thick 200 mm × mm plaques. Thermal stability was measured on a 3 mm thick test piece at 4"overhang. The mold release was Chemtrend 136. DETDA is commercial diethyltoluenediamine from Ethyl Corp. tBTDA is tertiarybutyltoluenediamine. Each had an equivalent weight of 89.1 g. The descriptor /L represents tBTDA made in the lab; /P represents pilot plant material similarly processed on a liquid injection molding machine. Only tBTDA could be processed above 30 pph chain extender in polyol; at that level DETDA test piece striation approached skin-core delamination.

From Table 3 the properties of isoequivalent DETDA and tBTDA are seen to be similar but consistently different for four polyols tested. The tBTDA RIM elastomers are more extensible (lower stress at the same strain) and show greater ultimate elongation but slightly lower thermal stability. The contribution to physical properties from the individual tertiarybutylated toluenediamine isomers is revealed in the Table 4. Data are presented for 0.95 and 1.05 isocyanate indices; to confirm the benefits of slight excess rather than slightly insufficient isocyanate. Of the two tBTDA isomers the 3-tert-butyl-2,6-toluenediamine appears to more significantly contribute to thermal instability and the tensile at break and ultimate % elongation are also inferior. It is believed this is caused by the fact 3tB26TDA is the less symmetric of the two isomers.

In Table 4 tBTDA data are compared with DETDA at 22 pph (weight parts chain extender per 100 weight parts polyol) chain extender in polyol. The tBTDA isomers show slightly higher flexural modulus, and slightly lower thermal stability as indicated by 0.33 and 0.20 inches sag versus 0.18 inches for DETDA. At 30 pph of polyol, DETDA is difficult to process, showing pre-gellation and test plaque striation bordering on skin-core delamination. AT this level of chain extender the flexural modulus is significantly higher for the tBTDA isomers than for DETDA and the thermally induced sags are both low at 0.06 and 0.04 inches for the 4" over hang test pieces. At 35 pph level of chain extender, a range in which DETDA is not processable, the tBTDA flexural modulus is 72000–82000 depending on NCO index and the thermal sags very low, reaching but 0.02" at 1.05 NCO index. Similarly low sag values and high flexural modulus values have also been attained with aminated polyether polyol -MDI prepolymer systems; there the 50% slower reactivity of tBTDA versus DETDA allows slower processing of comparable strength parts, or, for systems of comparable reaction velocity formulation of higher strength parts.

What is claimed is:

1. In a process for the production of polyurethane-urea elastomers comprising the steps of reacting:
   (a) an organic polyisocyanate with:
   (b) an organic compound having a molecular weight from about 400 to 12,000 and containing at least two Zerewitinoff active hydrogen atoms; and
   (c) an aromatic diamine chain extending agent;
   and curing the resultant reaction product, the improvement wherein at least a portion of the aromatic diamine used as said chain extender is a mono-tertiary-alkyltoluenediamine where the tertiary-alkyl group is ortho to an amine group and represented by the formula:

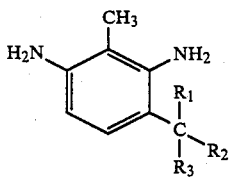

wherein $R_1$, $R_2$ and $R_3$ are $C_{1-3}$ alkyl groups or $R_2$ and $R_3$ are combined to form a $C_{5-6}$ membered ring.

2. The process of claim 1 wherein at least 50% of the equivalent weight of the total amount of aromatic diamine chain extender employed for reaction with the free-isocyanate is provided by the tertiary-alkyltoluenediamine.

3. The process of claim 2 wherein the polyurethane-urea elastomer is formed by reacting the isocyanate with said orgaic compound to form a prepolymer, said prepolymer having a free isocyanate content from about 5 to 25% by weight and then reacting said prepolymer with said aromatic diamine chain extender comprising mono-tertiary-alkyltoluenediamine.

4. The process of claim 3 wherein the mono-tertiary-alkyltoluenediamine is 2,6-diamino-3-tert-butyltoluene.

5. The process of claim 3 wherein said mono-tertiary-alkyltoluene-diamine is 2,6-diamino-3-tert-alkyltoluene.

6. The process of claim 4 wherein said isocyanate is 4,4'-methylene bis(phenylisocyanate).

7. The process of claim 3 wherein the mono-tertiary butyltoluenediamine is a mixture containing from about 65 to 80% by weight of 2,4-diamino-5-tert-butyltoluene and 20 to 35% by weight of 2,6-diamino-3-tert-butyltoluene.

8. The process of claim 2 wherein said organic compound is an aminated polyether polyol.

9. The process of claim 8 wherein said mono-tertiary-alkyltoluenediamine is selected from the group consisting of 2,6-diamino-3 tert-butyltoluene, 2,4-diamino-5-tert-butyltoluene. 3-tert-amyl-2,6-toluenediamine, 5-tert-amyl-2,4-toluenediamine, 3-tert-methylcyclohexyl-2,4-toluenediamine and 5-tert-methyl cyclohexyl-2,4-toluenediamine.

10. The process of claim 9 wherein said organic polyisocyanate is 4,4'-methylene-bis (phenylisocyanate).

11. In a polyurea composition formed by reacting an organic polyisocyanate with an amine terminated polyol or amine terminated polyester polyol and an aromatic diamine chain extender, the improvement which comprises as said chain extender 5-tert-butyl-2,4-toluenediamine or 3-tert-butyl-2,6-toluenediamine.

12. In a process of production of polyurethane elastomer moldings by a reaction injection molding process wherein an aromatic polyisocyanate, a hydroxy containing compound having molecular weights from about 400 to 12,000, an aromatic diamine chain extender, and catalyst for enhancing the reaction between the hydroxyl group and the isocyanate are mixed, injected into a mold, reacted and cured, the improvement which comprises including 2,6-diamino-3-$C_4$-$C_7$-tertalkyltoluene and is used in amount of at least 50% the equivalent weight of the aromatic diamine chain extending agent used.

13. The process of claim 12 wherein the chain extender is 3-tert-butyl-2,6-diaminotoluene.

14. The process of claim 12 wherein the chain extender system comprises a mix of aromatic diamine and polyol hydroxy containing compound, said hydroxyl containing compound having a molecular weight from about 400 to 12,000.

15. The process of claim 14 wherein the hydroxyl containing compound is a polyether, polythioether, polyacetal, polycarbonate, or a polyester polyol.

16. The process of claim 12 wherein the isocyanate employed is 4,4'-methylene bis(phenylisocyanate).

17. In a polyurethane composition formed by reacting an organic polyisocyanate with a hydroxyl containing compound having a molecular weight of from 400 to about 12,000 and an aromatic diamine chain extender the improvement wherein said aromatic diamine chain extending agent includes 2,6-diamino-3-tert-butyltoluene.

18. The composition of claim 17 wherein the monotert-butyl toluenediamine is 3-tert-butyl-2,6-diaminotoluene or a mixture containing from 65 to 80% by weight of 5-tert-butyl-2,4-diaminotoluene.

* * * * *